D. W. HAYNES.
TILTABLE TURN TABLE.
APPLICATION FILED JAN. 13, 1917.
1,225,030.
Patented May 8, 1917.
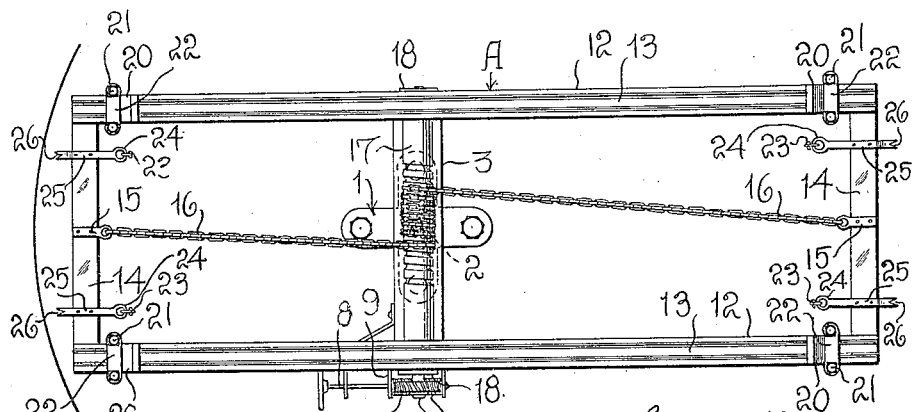
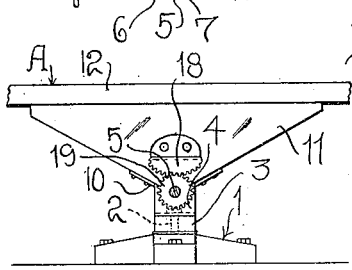
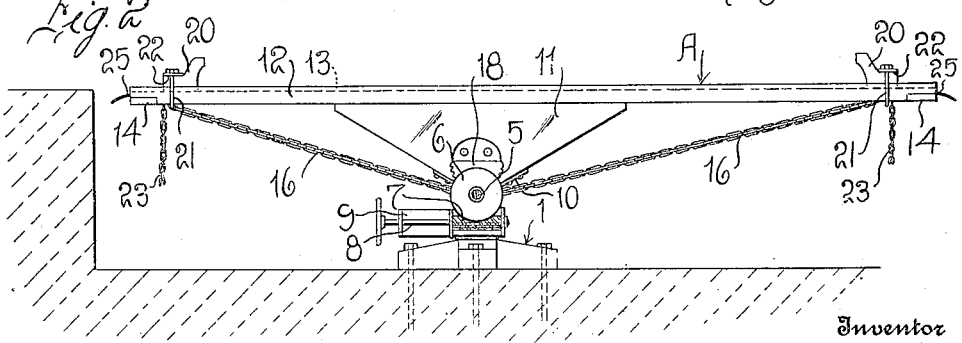
Inventor
D. W. Haynes
By Watson E. Coleman
Attorney

UNITED STATES PATENT OFFICE.

DAVID W. HAYNES, OF LAKEMP, OKLAHOMA.

TILTABLE TURN-TABLE.

1,225,030.  Specification of Letters Patent.  Patented May 8, 1917.

Application filed January 13, 1917. Serial No. 142,274.

*To all whom it may concern:*

Be it known that I, DAVID W. HAYNES, a citizen of the United States, residing at Lakemp, in the county of Beaver and State of Oklahoma, have invented certain new and useful Improvements in Tiltable Turn-Tables, of which the following is a specification, reference being had to the accompanying drawings.

This invention comprehends certain new and useful improvements in automobile accessories, and relates particularly to turn tables for garages, and shops for the repair of motor vehicles.

The invention has for its primary object an improved turn table of this character, the parts of which are so constructed and arranged that the automobile or the like may be tilted to any desired inclination, as well as turned, so as to facilitate to a maximum degree and render comfortable the work of the machinist, repairman or other operator underneath the car to be repaired or adjusted.

A further object of the invention is a practical, durable and efficient construction of tiltable turn table that will be composed of comparatively few parts that may be easily manufactured and assembled and not liable to get out of order, and the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which Figure 1 is a plan view of a tiltable turn table constructed in accordance with my invention, Fig. 2 is a side elevation thereof, Fig. 3 is a similar view of a portion of the apparatus partly in section, and Fig. 4 is a transverse sectional view through one side of the tiltable frame of the device.

Referring to the drawing, the numeral 1 designates the base of my improved tiltable turn table, said base being of any desired construction, shape or design, and in the present instance composed of cross beams secured rigidly in a stationary manner to the bed of a depressed portion or well in the floor of a garage, repair shop or the like, the base being preferably secured in position by means of bolts passing therethrough and being embedded in the concrete of which the floor and its well are preferably composed. Projecting upwardly from the middle of the base 1 is a vertically disposed pivot post 2, on which a bolster 3 is mounted to turn, and U-shaped bearings 4 are carried by the bolster 3 at the ends thereof, a transversely extending shaft 5 being journaled in said bearings. A worm gear 6 is secured to one end of the shaft 5 and meshes with a worm 7 which is mounted on one end of an actuating shaft 8 which is journaled in a bracket 9 carried by the bolster at one end of the latter.

Mounted upon the shaft 5 between the upwardly projecting members of the U-shaped bearings 4, are bearings 10, said bearings 10 being adapted to turn on the shaft 5 and being secured to the lower ends of downwardly tapered blocks or side members 11 that are laterally spaced from each other and that form parts of a car supporting frame A. This frame A also embodies side bars or sills 12 that are preferably formed on the upper face with longitudinally extending grooves 13 upon which the wheels of the car are adapted to be run, said sills being normally disposed on a level with the plane of the floor of the building in which the device is installed. The frame A also includes cross bars 14 that are secured at their ends to the ends of the sills 12, and straps 15 are attached to the cross bars 14 at middle points and are secured to the ends of a chain 16 which is adapted to wind upon a spirally grooved drum 17 carried by the shaft 5 hereinbefore mentioned. Toothed segments 18 are secured to the outer sides of the blocks 11 with their toothed edges projecting downward, and said segments mesh with pinions 19 which are carried by and secured to the shaft 5 at the ends of the latter.

In order to securely hold a car upon the frame A I provide retaining blocks 20 which are designed to abut against the wheels of the vehicle and secured in adjusted positions, according to the length of the car, by means of U-shaped clips 21 encircling the side bars or sills 12 and secured by nuts or the like to glands or tie bars 22 extending across and bearing upon the upper faces of the blocks 20; and chains 23 are also provided, said chains being designed to extend around the front and rear axle of the car and being secured at one end to eyes 24 formed on arms 25 that are carried by the cross bars 14, the outer ends of said arms being formed with hooks or bifurcations 26 to receive the relatively free ends of the chains 23 after they have been passed around the axles.

From the foregoing description in connection with the accompanying drawing, the operation of my improved tiltable turn table will be apparent. In the practical use of the device, the frame A is supported in a horizontal or level position and the car to be operated upon is moved upon the grooved sills 12 and held thereon by means of the retaining blocks 20 and chains 23 as hereinbefore described. The frame with the car supported thereby and securely held thereon may then be tilted to the desired angle or inclination whereby the operator may repair or adjust the parts underneath the car with considerably more convenience than would otherwise be the case. This turning action will be easily secured by merely turning the actuating shaft 8 in the required direction, said shaft being rotated by any desired means (not shown). It will thus be seen that I have provided a very practical, durable and efficient construction of tiltable turn table which may not only be very easily turned by swinging the bolster around but which may also be tilted upon the bolster as hereinbefore described.

While the accompanying drawing illustrates what I believe to be the preferred embodiment of my invention, it is to be understood that the invention is not limited thereto but that various changes may be made in the construction, arrangements and proportions of the different parts without departing from the scope of the invention as claimed.

What is claimed, is:

1. A device of the character described comprising a base, a bolster mounted to swing thereon in a horizontal plane, a vehicle supporting frame tiltable in a vertical plane upon said bolster and carried thereby, and means carried by the bolster and engageable with said frame for tilting the latter and holding it in its adjusted positions, said means including a flexible member secured to the opposite end portions of the frame.

2. A device of the character described comprising a base, a bolster mounted to turn on said base, a transversely extending shaft journaled on said bolster, means carried by the bolster and engageable with the shaft for turning the latter, a frame tiltable on said bolster and adapted to support a car, a drum carried by said shaft, and a chain connected at its ends to said frame and winding around said drum.

3. A device of the character described, comprising a base, a bolster mounted to turn thereon, a transversely extending shaft journaled on said bolster, means carried by the bolster for turning said shaft, a frame adapted to support a car and tiltably mounted upon said shaft, a toothed segment carried by said frame, a pinion carried by said shaft and engaging said segment, and a flexible member connecting the opposite end portions of the frame and having its intermediate portion wound around the shaft.

4. A device of the character described comprising a base, a bolster mounted to turn on said base, U-shaped bearings carried by said bolster at the ends of the latter, a shaft journaled in said bearings, bearings mounted to turn on said shaft between the first named bearings, a frame adapted to support a car and embodying side members to which said second named bearings are secured, said frame also embodying longitudinally extending sills, and cross bars connected to said sills at the ends of the latter, means carried by said sills for retaining a car thereon, and means carried by the bolster and connected to said drum for turning the latter on the bolster and holding the drum at different adjusted positions.

5. A device of the character described comprising a base, a pivot pin projecting upwardly therefrom, a bolster mounted to turn in a horizontal plane on said pin and provided at its ends with U-shaped bearings, a shaft journaled in said bearings and provided at one end with a worm gear, a bracket secured to one end in said bolster, a shaft journaled in said bracket, a worm carried by the last named shaft and meshing with said worm gear, pinions carried by said shaft, bearings mounted on the first named shaft between the members of said U-shaped bearings, a frame provided with side blocks connected to said second named bearings, toothed segments secured to the sides of said blocks and meshing with said pinions, said frame being also provided with longitudinal sills and grooved bars connecting said sills together in spaced relation to each other, retaining blocks carried by said sills and adjustably mounted thereon, a chain secured to said cross bars, a drum carried by the first named shaft and around which said chain is adapted to wind, arms carried by the cross bars of the frame and provided at one end with hooks, and chains secured to said arms and adapted to extend around the axles of the car and engageable with said hooks, for the purpose specified.

6. A device of the character described including a vehicle supporting frame tiltable in a vertical plane, means for tilting said frame and securing means carried by the opposite end portions of the frame, said means comprising arms secured to the frame and disposed longitudinally thereof, and a flexible member secured to an end portion of each of said arms, the opposite end portion of the arm being provided with a notch.

In testimony whereof I hereunto affix my signature in the presence of two witnesses.

DAVID W. HAYNES.

Witnesses:
W. A. LOTHMAN,
JOHN F. ROGERS.

Copies of this patent may be obtained for five cents each, by addressing the "Commissioner of Patents, Washington, D. C."